J. K. MAYO.

HOUSE DECORATIONS, FURNITURE, FITTINGS, AND THE LIKE.

No. 3,089. Reissued Aug. 18, 1868.

Witnesses
H. B. Deming
W. H. Brereton.

Inventor
John K. Mayo
By Knight Bros
Attys

UNITED STATES PATENT OFFICE.

JOHN K. MAYO, OF NEW YORK, N. Y., FOR HIMSELF, AND A. AND G. B. CUSHING, OF ST. JOHN, NEW BRUNSWICK, ASSIGNEES OF JOHN K. MAYO.

IMPROVEMENT IN HOUSE DECORATIONS, FURNITURE, FITTINGS, AND THE LIKE.

Specification forming part of Letters Patent No. 51,735, dated December 26, 1865; Reissue No. 3,089, dated August 18, 1868.

DIVISION E.

*To all whom it may concern:*

Be it known that I, JOHN K. MAYO, formerly of Portland, Maine, but now of the city, county, and State of New York, have invented certain Improvements in the Construction of House Decorations, Furnishings, and Fittings; and the following is declared to be descriptive of the said invention, reference being had to the accompanying drawings.

The invention consists in constructing various house decorations, furnishings, and fittings of a plurality of scale-boards or thin sheets or veneers of wood, cemented or otherwise firmly connected together, with the several scales or thicknesses so placed that the joints (ends or edges) shall be broken by each alternate layer, and the grain of the wood crossed or diversified, so that they will afford to each other mutual strength, support, and protection against checking, splitting, swelling, or shrinking.

Figure 1:
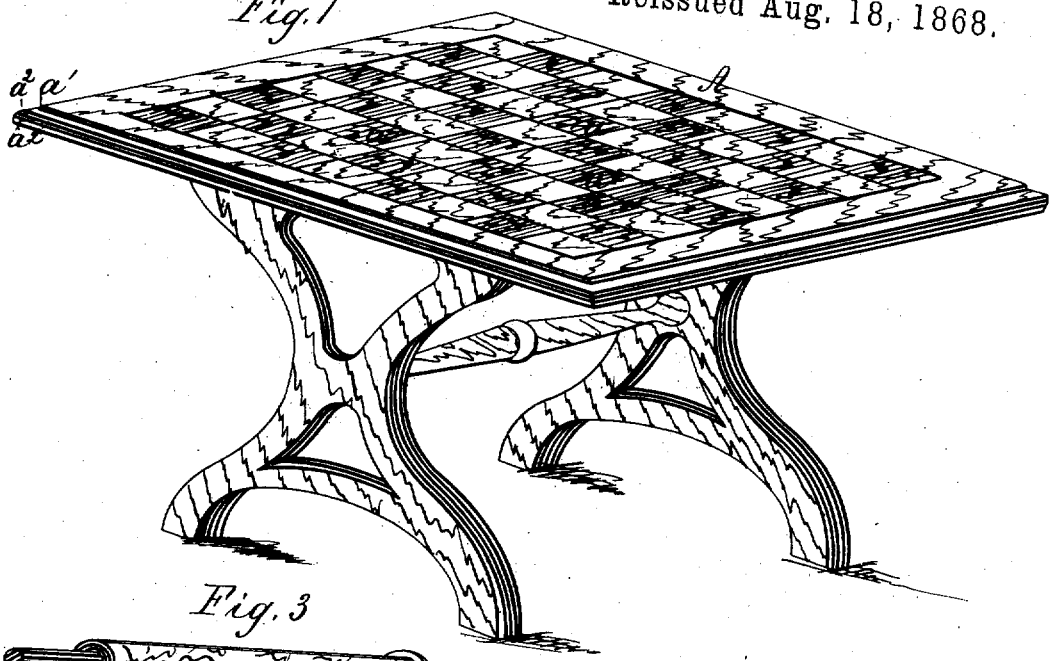
Figure 3:
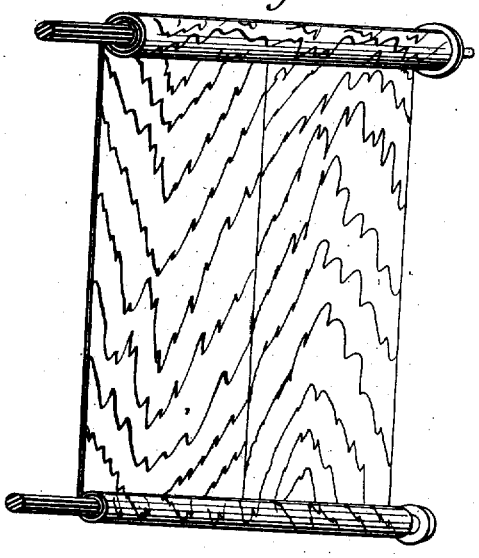
Figure 2:
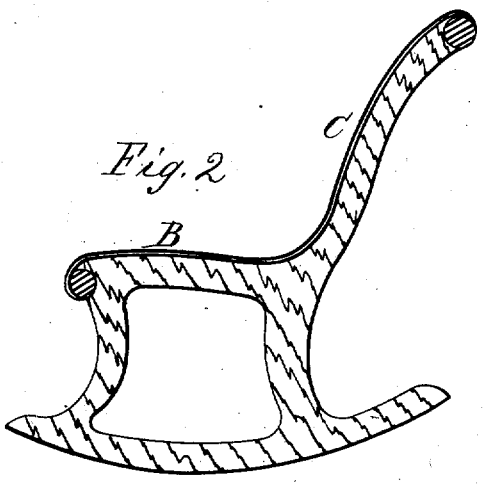

In the drawings, Figure 1 is a sectional perspective view of a chess-table illustrating the invention. Fig. 2 is a vertical section of a chair. Fig. 3 is a perspective sectional view of a window-shade, partially rolled up.

In all the figures it is designed to represent the grain of the respective layers of wood, or some of them, running in diverse directions from others, for the objects already explained.

In constructing table-tops or other furniture or articles, any ornamental form or figure may be imparted by placing the layers of wood (previously coated with cement) into or upon a former, and there subjecting them to the requisite pressure to unite the layers of wood and produce the desired shape.

In the table-top A, $a^1$ $a^2$ $a^3$ represent different layers or laminæ of wood, and *a a a* squares of wood of various colors to form a chess-board.

In the chair, Fig. 2, the bottom B may be formed of a flexible material, made up by the union of two or more thin layers of wood, having the grain crossed or diversified in direction, and united by suitable cement.

The chair-back C may be made of any desired form; and by forming it of a number of scale-boards suitably united, with the grain diversified in direction, a back is produced possessing great strength, and practically homogeneous and jointless from end to end.

The window-shade may be made of two or more layers or laminæ of wood as thin as paper, the grain in one layer running in a diverse direction from the other layer.

Floor-cloth made of this material embraces the advantage of strength and economy over that produced by coating textile material with paint. It is not liable to break, and is rendered, by a single coat of varnish or paint, a thoroughly efficient, cheap, and durable floor-covering, possessing sufficient flexibility, and produced at a small fraction of the cost of floor-cloth as usually made.

The invention is also applicable to the construction of chairs, tables, desks, chess-boards, bedsteads, or parts thereof, cornices, brackets, book shelves and cases, panels, wardrobes, screens, wall-coverings, Venetian blinds, picture and looking-glass frames, window shades or curtains, carpets, carpet coverings or linings, mats, floor-cloths, sacking bottoms, couches, cots, and other articles of similar nature too numerous to mention.

By adopting the well-known process of wet and dry heating in course of manufacture, the several scales of wood may be brought to such a state of pliability as to assume any desired form by compression in a matrix or upon formers; and by using different degrees of thickness, in connection with cements of different kinds, the character of the article made may be either rigid or flexible.

Dyes of various hues may be used as coloring for the sheets of wood, as fancy may incline.

The following is claimed as new in the invention of JOHN K. MAYO:

The employment or use of the compound scale-board hereinbefore described in the formation of the specified or analogous structures or articles of house decoration, fitting, and furnishing.

JOHN K. MAYO.

Witnesses:
EDWARD WILLARD,
S. W. FROST.